United States Patent [19]

Wilde

[11] Patent Number: 4,944,268
[45] Date of Patent: Jul. 31, 1990

[54] APPARATUS FOR VARYING THE POSITION OF A CONTROL DEVICE OF AN INTERNAL COMBUSTION ENGINE

[75] Inventor: Werner Wilde, Schwieberdingen, Fed. Rep. of Germany

[73] Assignee: Robert Bosch GmbH, Stuttgart, Fed. Rep. of Germany

[21] Appl. No.: 406,934

[22] Filed: Sep. 13, 1989

[30] Foreign Application Priority Data

Nov. 17, 1988 [DE] Fed. Rep. of Germany ....... 3838915

[51] Int. Cl.⁵ .............................................. F02D 11/10
[52] U.S. Cl. .................................... 123/342; 123/400
[58] Field of Search .............. 123/342, 361, 376, 399, 123/400; 180/197

[56] References Cited

U.S. PATENT DOCUMENTS

| 4,424,781 | 1/1984 | Speer et al. | 123/342 |
| 4,530,326 | 7/1985 | Mann et al. | 123/342 |
| 4,703,823 | 11/1987 | Yogo et al. | 123/399 X |
| 4,756,287 | 7/1988 | Sakakibara et al. | 123/342 |
| 4,785,691 | 11/1988 | Papenhagen et al. | 74/877 |
| 4,787,353 | 11/1988 | Ishikawa et al. | 123/400 X |
| 4,856,477 | 8/1989 | Hanaoka et al. | 123/400 X |

FOREIGN PATENT DOCUMENTS

| 0230576 | 8/1987 | European Pat. Off. | |
| 3628538 | 3/1988 | Fed. Rep. of Germany | |
| 3632126 | 3/1988 | Fed. Rep. of Germany | |
| 3641244 | 6/1988 | Fed. Rep. of Germany | |
| 0122742 | 7/1984 | Japan | 123/399 |
| 2186024 | 8/1987 | United Kingdom | |

Primary Examiner—Willis R. Wolfe
Attorney, Agent, or Firm—Edwin E. Greigg

[57] ABSTRACT

The invention relates to an apparatus for varying the position of a fuel control device that controls the output of an internal combustion engine and is connected to an operating element via a transmission device. In such an apparatus, a control motor can be operatively connected via a gear with a first rotary element connected to the control device and rotatably supported relative to a coaxial second rotary element connected to the operating element. The two rotary elements are prestressed by a spring that forces an arm each to contact one another at stops facing one another. To limit the control motor intervention to the regulated operating state, the invention provides a gear assembly that has at least one drive wheel operatively connected to the control motor, which drive wheel can be shifted from a position of repose, in which the operative connection with the first rotary element is interrupted, into a working position, in which the operative connection with the first rotary element is established to control the fuel control device.

29 Claims, 3 Drawing Sheets

APPARATUS FOR VARYING THE POSITION OF A CONTROL DEVICE OF AN INTERNAL COMBUSTION ENGINE

BACKGROUND OF THE INVENTION

The invention relates to an apparatus for varying the position of a control device, connected to an operating element via a transmission device, that controls the output of an internal combustion engine.

With various kinds of engine regulation, such apparatus is needed for intervention into the transmission line leading from an operating element, such as a gas pedal, to a control device, such as the throttle valve of a carburetor or the adjusting lever of an injection pump, to enable influencing, i.e., varying the position of the control device as a function of various parameters. Such variations serve for instance to avoid slip between the driven wheels of a motor vehicle and the surface of the road, either during acceleration from excessive drive power, leading to so-called drive slip, or during braking from excessive engine braking moment, which leads to so-called braking slip. Such variations may also serve to limit the maximum speed of a motor vehicle independently of the gas pedal position, or to maintain a constant vehicle speed such as with a cruise control, again independently of the gas pedal position. In maximum vehicle speed limitation, the position of the control device is varied in the direction of a reduction in engine output when the desired maximum speed is reached. In constant vehicle speed regulation, the position of the control device is varied in the direction of an engine output decrease or increase, depending on whether the actual vehicle speed, detected for instance by wheel sensors, is above or below the desired constant vehicle speed.

In such apparatus, two operating states can be distinguished: first, the unregulated state, in which the position of the otherwise uninfluenced control device is controlled directly by the operating element, and second, the regulated state, in which at a predetermined position of the operating element, the control device position is varied, as compared with the control device position corresponding to the position of the operating element, by a control motor.

In a known apparatus for varying the position of a control device connected to an operating element via a transmission device and controlling the output of an internal combustion engine, the control motor can be operatively connected via a gear with a first rotary element connected to the control device, and this first rotary element is rotatably supported relative to a coaxial second rotary element connected to the operating element; the two rotary elements are prestressed by a spring, contacting one another at associated stops facing one another.

In this known apparatus, the gear is coupled with the first rotary element via a free wheel, so that upon relief of the operating element, the control device can be restored by a restoring spring, provided in the transmission device, without also rotating the gear and the rotor of the control motor in the process. This has a disadvantage that the free wheel permits adjustment of the apparatus in only one direction or rotation, and that the restoring spring must be relatively strong to overcome the unavoidable residual friction in the free wheel. Since each time the operating element is put under load both the gear and the rotor of the control motor must be rotated as well via the free wheel, the spring in the unregulated operating state, or in other words when the control motor is exerting no influence, that keeps the two rotary elements in contact with one another must be greatly reinforced, to prevent the two rotary elements from rotating apart in the unregulated operating state.

OBJECT AND SUMMARY OF THE INVENTION

An object of the invention is to disclose an apparatus which in the operating state, in which the apparatus is uninfluenced by the control motor, the control motor rotor is not moved by the motion of other elements. According to the invention, this is attained by providing that the gear has at least one drive wheel operatively connected to the control motor, which drive wheel can be shifted from a position of repose, in which the operative connection with the first rotary element is interrupted, into a working position, in which the operative connection with the first rotary element is established. With this embodiment, the operative connection between the control motor and the first rotary element is restricted to the state of the apparatus that is uninfluenced by the control motor.

To enable simple variation of the control device via the control motor both in the direction of higher output and in the direction of lower output of the engine, it may be provided in a feature of the invention that for each direction of rotation of the first rotary element, the gear has a separate drive wheel that is shiftable out of a position of repose into a working position.

The shifting of the applicable drive wheel out of the position of repose into the working position may be effected by an electrically actuatable device. According to the invention, it is preferable for the applicable drive wheel to be shiftable from the position of repose to the working position by the startup of the control motor.

In a further feature of the invention, it may be provided that the drive wheel is supported on a rocker that is rotatable about the pivot shaft of a pinion driving the drive wheel.

For simple influencing of the control device in both directions, it is proposed according to the invention that both drive wheels are supported on the same rocker and mesh with the same pinion.

For returning the drive wheel into its position of repose, according to the invention the rocker may be prestressed by a spring into a position of repose, in which the operative connection of the applicable drive wheel with the first rotary element is interrupted. It may also be provided according to the invention that the rocker is prestressed by two contrarily acting springs into a position of repose, in which the operative connection of the applicable drive wheel with the first rotary element is interrupted. This is particularly advantageous when there are two drive wheels supported on one rocker, each associated with a different direction of rotation.

In a further feature of the invention, the rocker is operatively connected via a slip coupling with the pinion driving the drive wheel.

To enable setting or adjusting the range in which the influence by the control motor is possible, it is proposed in accordance with the invention that a third rotary element that can be operatively connected with the drive wheel by the shifting thereof and is coaxially rotatable with the first rotary element is provided, which can be brought into engagement with a pawl disposed on the first rotary element.

The invention will be better understood and further objects and advantages thereof will become more apparent from the ensuing detailed description of two preferred embodiments, taken in conjunction with the drawings.

DESCRIPTION OF THE PREFERRED EMBODIMENTS

Figure 1:
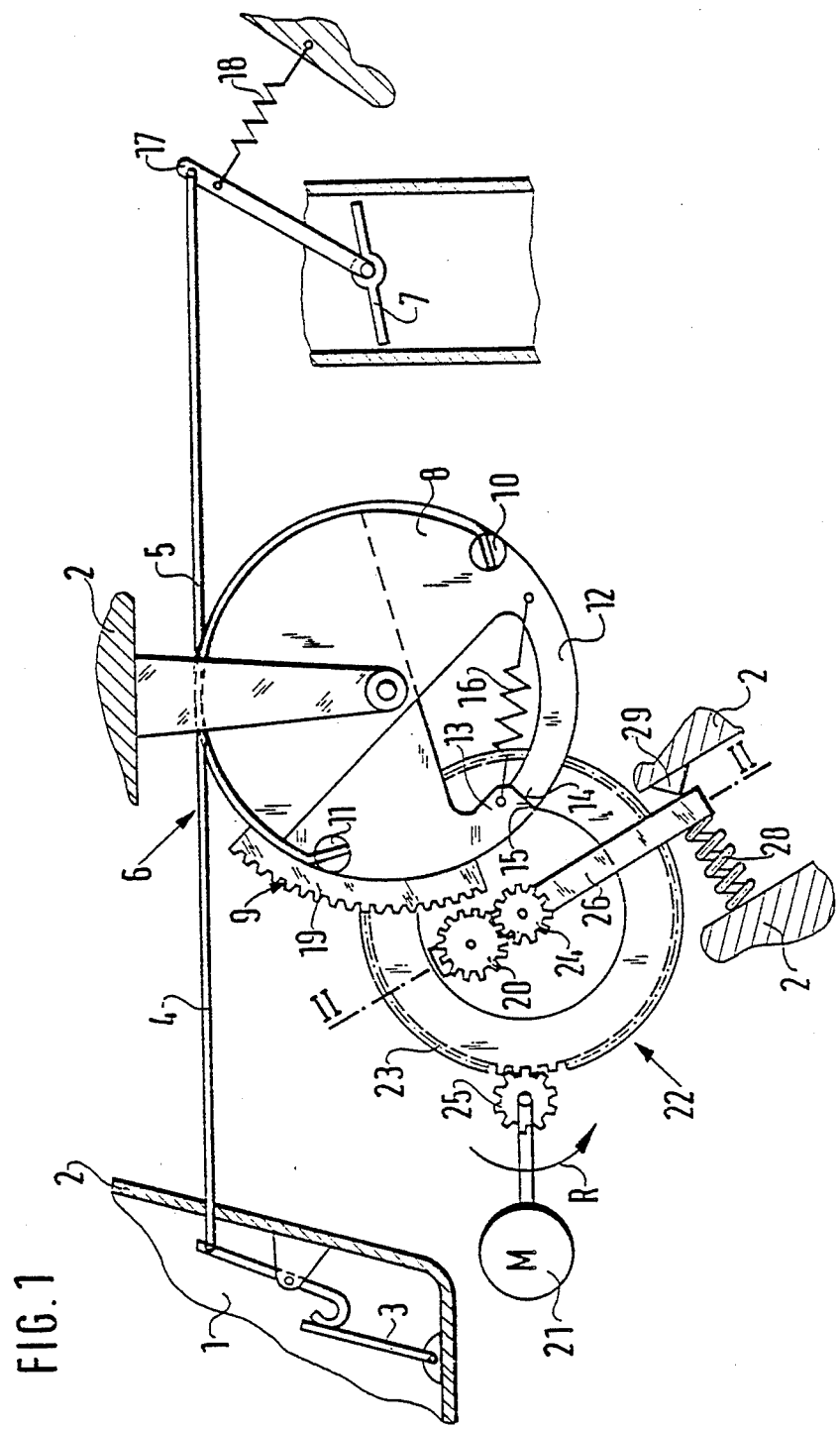
FIG. 1 schematically shows a transmission device, which connects an operating element embodied as a gas pedal with a control device embodied as a throttle valve of an internal combustion engine, in which an embodiment of an apparatus according to the invention is disposed that in the regulated operating state provides for instance for a reduction in engine output.
Figure 2:
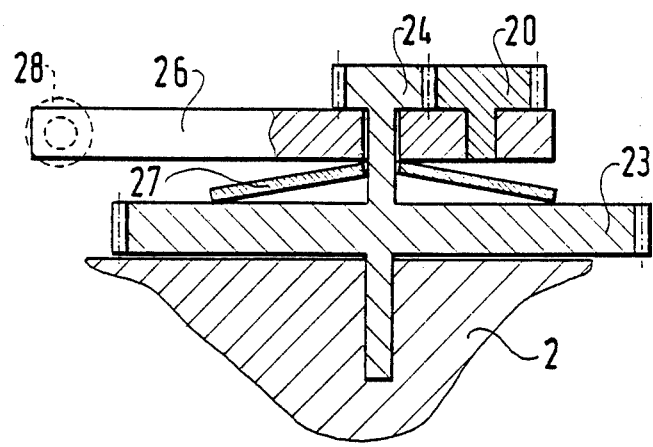
FIG. 2 is a section taken through the gear coupled with the control motor, along the line II—II of FIG. 1.

In the exemplary embodiment shown in FIGS. 1 and 2, an operating element 3 embodied as a gas pedal disposed in a floor area 1 of a motor vehicle 2 is connected with a control device 7 embodied as a throttle valve via a transmission device 6 equipped with separate cable pulls 4 and 5; the position of the control device determines the output of the engine, not shown in further detail, of the vehicle 2.

Two disk-shaped rotary elements 8, 9 of circular circumference and coaxially disposed on a pivot shaft attached to the vehicle are incorporated into the transmission device 6 and the ends 10, 11 of the cables pulls 4 and 5 are attached to the disk-shaped rotary elements 8 and 9. The first cable 5 is secured at its end 11 to the first rotary element 9 and rests on its circular outer circumference with the opposite end connected to one end of a throttle adjusting lever 17 which is connected at its opposite end to the throttle valve 7. The second cable pull 4 is connected at one end to the gas pedal 3 and is secured at its opposite end 10 to the second rotary element 8 and rests on its circular circumference. The two rotary elements 8 and 9 are provided with associated extensions 12 and 13 facing one another, the face ends are, embodied as stops 14 and 15 which rest on one another in end-to-end relationship and are kept in contact by means of a spring 16 which is connected to both extensions 12 and 13. In the transtransmission device 6, a restoring spring 18 is provided that engages the throttle valve adjusting lever 17 and closes the throttle valve 7 when the gas pedal 3 is relieved.

The first rotary element 9 has a gear segment 19 on a portion of its outer circumference which can be operatively connected to a drive wheel 20 of a gear assembly 22 that is drivable by a control motor 21 for varying the throttle valve position in the regulated operating state of the apparatus.

The gear assembly 22 shown in section in FIG. 2 and coupled with the control motor 21 has two coaxial gear wheels 23 and 24 of different diameter joined in a manner fixed to the same axle against relative rotation and disposed one above the other in spaced apart fashion. The lower, larger gear wheel 23 meshes with a drive pinion 25 of the control motor 21, while the upper, smaller gear wheel 20 meshes with the drive wheel 24. Between the upper gear wheel 24 and the lower gear wheel 23, a rocker arm 26 that is coaxially rotatable relative to these two gear wheels is provided, which by means of a disk spring 27 is pressed against the underside of the upper gear wheel 24 and on which the drive wheel 20 meshing with the upper gear wheel 24 is freely, rotatably supported. The rocker arm 26 extends laterally beyond the gear 23 and is pressed by a restoring spring 28 against a stop 29, attached to the vehicle, that determines the position of repose of the rocker arm 26, as shown in FIG. 1. Upon startup of the control motor 21, with the direction of rotation of the drive pinion 25 as indicated by the arrow R in FIG. 1, the rocker arm 26 is carried along away from the stop 29 (clockwise as seen in FIG. 1) by the frictional contact with the upper gear wheel 24, counter to the action of the restoring spring 28, and continues to rotate until the drive wheel 20 has engaged the toothed segment 19 of the first rotary element 9. From then on, slippage of the slip coupling formed between the upper gear wheel 24 and the rocker arm 26, or between the disk spring 27 and the lower gear wheel 23, occurs. During the continued operation of the control motor, the first rotary element 9 is rotated and the rocker arm 26 remains in its working position; the torque acting upon the rocker arm 26, which is brought to bear on the rocker by the slip coupling formed between the upper gear wheel 24 and the rocker arm 26 with the aid of the disk spring 27, is greater than the reverse torque brought to bear by the restoring spring 28. If the control motor 21 is switched off, then the drive moment disappears, and the rocker arm 26 is rotated back into its position of repose by the restoring spring 28, and the operative connection of the drive wheel 20 with the first rotary element 9 is interrupted. This may optionally be reinforced by a brief reversal of the polarity of the control motor 21. If desired, the reversal of polarity of the control motor 21 can also be ultilized to pivot the rocker 26 back into the position of repose, in this case, which is why the restoring spring 28 can then be dispensed with.

In the exemplary embodiment of FIGS. 1 and 2, the control device 7 can be varied by the control motor 21 only in the direction of a power reduction; the control motor 21 first puts the drive wheel 20 into engagement with the toothed segment 19 of the first rotary element, and then, via the drive wheel 20, rotates the first rotary element 9 out of its contact with the second rotary element 8, counter to the action of the spring 16. As a result, the two stops 14 and 15 are separated from one another; the tension of the spring 16 is increased, and from the uninfluenced position dictated by the gas pedal position and with the two rotary elements 8 and 9 in contact with one another, the throttle valve 7 is either adjusted via the cable 5 and the restoring spring 18 in the direction of an engine power reduction until such time as the control motor 21 is switched off, or is adjusted by the control motor 21 by a rotational angle determined by the regulating device triggering the control motor 21. Then, the operative connection between the drive wheel 20 and the first rotary element 9 is interrupted by the pivoting of the rocker arm 26 back into its position of repose, and with the gas pedal remaining unchanged the first rotary element 9 is rotated by the spring 16 back into its stop contact with the second rotary element 8, thus rotating the throttle valve 7 back into the uninfluenced position it occupied prior to the regulation process.

Since the operative connection of the control motor 21 with the first rotary element 9 is maintained only until such time as the drive moment of the control motor 21 keeps the rocker arm 26 rotated counter to the force of its restoring spring 28, the control motor is not rotated along with the others during the unregulated operating state of the apparatus.

Instead of the slip coupling effecting the coupled rotation of the rocker arm 26, some other mechanism may also be provided for shifting the drive wheel 20 out of its position of repose into the working position. For example, the rocker arm can be pivoted between its position of repose and its working position by means of an electromagnet engaging the part of the rocker 26 that extends out of the gear 22.

If, in an apparatus according to FIGS. 1 and 2, it is desired to use an optional influence limited to one rotational direction to increase output — for instance, to control a constant predetermined vehicle speed as a function of wheel sensor signals with the gas pedal not under load — then all that needs to be done is to rotate the rocker arm 26 with the stop 29 and restoring spring 28 by 180° compared to the position shown in FIG. 1, to rotate the two rotary elements 8 and 9 counterclockwise by 60°, and to reverse the direction of rotation of the control motor 21.

Figure 4:
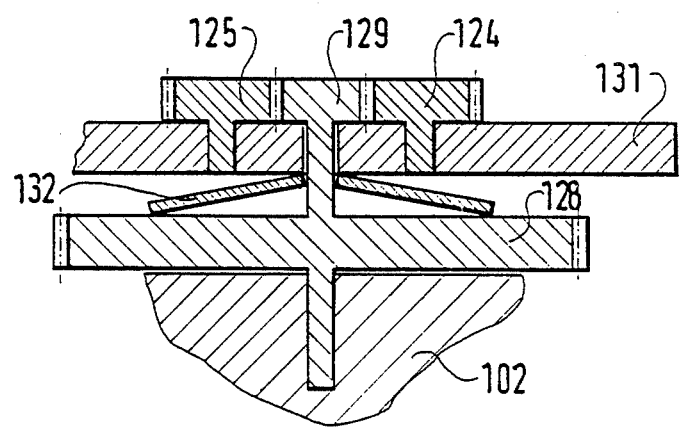
FIG. 4 is a section through the gear coupled with the control motor, taken along the line IV—IV of FIG. 3.
Figure 3:
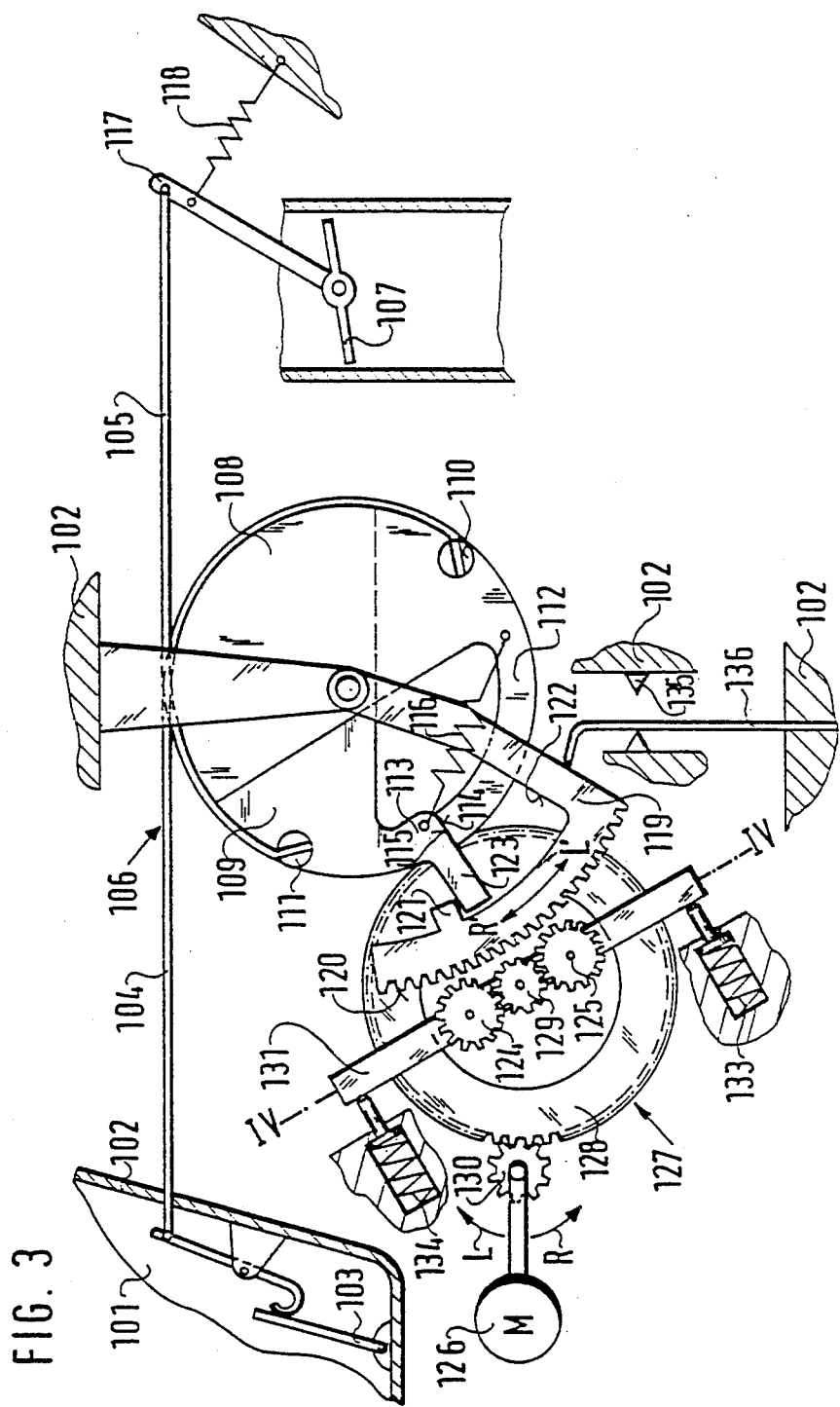
FIG. 3 schematically shows a transmission device, which connects an operating element embodied as a gas pedal with a control device embodied as a throttle valve of an internal combustion engine, in which an embodiment of an apparatus according to the invention is disposed that in the regulated operating state provides a reduction or an increase in engine output, depending on the direction of rotation of the control motor.

In the exemplary embodiment shown in FIGS. 3 and 4, an operating element 103, embodied as a gas pedal and disposed in the floor area 101 of a motor vehicle 102, is connected via a transmission device 106 equipped with cables pull 104 and 105 to a control device 107 embodied as a throttle valve, the position of which determines the output of the engine, not shown in further detail, of the motor vehicle 102.

Two disk-shaped rotary elements 108, 109 of circular circumference and coaxially disposed on a pivot shaft attached to the vehicle are incorporated into the transmission device 106 and the ends 110, 111 of the cables 104 and 105 are attached to them. The first cable 105, connected to the throttle valve 107 via lever 117, is secured at its end 111 to the first rotary element 109 and rests on its circular outer circumference. The second cable 104, connected to the gas pedal 103, is secured at its end 110 to the second rotary element 108 and rests on its circular circumference. The two rotary elements 108 and 109 are provided with associated extensions 112 and 113 facing one another, the face ends of which, embodied as stops 114, 115, are in contact with each other and are kept in contact by means of a spring 116 engaging both extensions 112, 113. In the transmission device 106, a restoring spring 118 is provided that engages the throttle valve adjusting lever 117 and closes the throttle valve 107 when the gas pedal 103 is relieved.

Coaxially to the two rotary elements 108 and 109, a third rotary element 119 is provided, which has a gear segment 120, on the inside of which oriented toward the pivot shaft a recess, defined by lateral stops 121 and 122, is provided for engagement with a pawl 123 disposed on the first rotary element 109.

The toothed segment 120 of the third rotary element 119 is provided for engagement with one of two drive wheels 124, 125 of a gear assembly 127 that is coupled to a control motor 126. The gear assembly 127 shown in section in FIG. 4 has two coaxial gear wheels 128 and 129 of different diameters, joined in a manner fixed against relative rotation and disposed one above the other in spaced apart fashion, of which the lower, larger gear wheel 128 meshes with a drive pinion 130 of the control motor 126, while the upper, smaller gear wheel 129 meshes with the drive wheels 124 and 125. Between the upper gear wheel 129 and the lower gear wheel 128, a rocker arm 131 that is coaxially rotatable relative to these two gear wheels is provided, which by means of a disk spring 132 is pressed against the underside of the upper gear wheel 129 and in which the drive wheels 124 and 125 meshing with the upper gear wheel 129 is supported freely rotatably. The rocker arm 131 is extended laterally out of the gear assembly 127 and by means of two compression springs 133 and 134 engaging opposite ends of the rocker arm 131 is kept in a position of repose in which the two drive wheels 124, 125 supported on the rocker arm 131 are spaced apart from the toothed segment 120 of the third rotary element 119. In the position of repose, each end of the rocker arm 131 rests on the compression spring 133 or 134 associated with that end and prestressed into a terminal position. Since the two compression springs 133 and 134 exert mutually contrary torques with respect to the axis of rotation of the rocker arm 131, in the unregulated state of the apparatus the rocker arm 131 is kept in the position of repose shown in FIG. 3.

Upon startup of the control motor 126, with the direction of rotation of the drive pinion 130 as indicated by the arrow R in FIG. 3, for reducing the engine output, the rocker arm 131 is carried along by the frictional contact with the upper gear wheel 129, clockwise as seen in FIG. 3, counter to the action of the spring 133, and continues to rotate until the drive wheel 124 has engaged the toothed segment 120 of the third rotary element 119. From then on, slippage of the slip coupling formed between the upper gear wheel 129 and the rocker arm 131, or between the disk spring 132 and the lower gear wheel 128, occurs. During the continued operation of the control motor, with the direction of rotation of the drive pinion 130 as indicated by the arrow R, the third rotary element 119 is rotated and the rocker arm 131 remains in its working position; the torque acting upon the rocker arm 131, which is brought to bear on the rocker by the slip coupling formed between the upper gear wheel 129 and the rocker arm 131 with the aid of the disk spring 132, is greater than the reverse torque brought to bear by the restoring spring 133. If the control motor 126 is switched off, then the drive moment disappears, and the rocker arm 131 is rotated back into its position of repose by the restoring spring 133, and the operative connection of the drive wheel 124 with the third rotary element 119 is interrupted.

Upon startup of the control motor 126, with the direction of rotation of the drive pinion 130 as indicated by the arrow L in FIG. 3, for increasing the engine output, the rocker arm 131 is rotated counterclockwise as seen in FIG. 3 by the slip coupling until the drive wheel 125 has engaged the toothed segment 120 of the third rotary element 119. The torque transmitted to the rocker arm 131 by the slip coupling is greater than the reverse torque brought to bear by the restoring spring 134. Upon shutoff of the control motor 126, the drive moment disappears, and the rocker arm 131 is rotated back into its position of repose, and the operative connection of the drive wheel 125 with the third rotary element 119 is interrupted.

In the exemplary embodiment of the apparatus as shown in FIGS. 3 and 4, the position of the throttle valve 107 is varied in the direction of either output reduction or output increase as a function of the direction of rotation of the control motor 126, with the rotational direction of the drive pinion 130 as indicated by the arrow R or L; the third rotary element 119 is always rotated first relative to the first rotary element 109, until the pawl 123 of the first rotary element 109 rests either on the stop 121 or on the stop 122, and the influence becomes effective only whenever both the third rotary element 119 and the first rotary element 109, or all three rotary elements 108, 109, 119, are rotated together. The spacing apart of the two stops 121 and 122, or the size of the recess defined by them, makes it possible for the throttle valve 107 to be opened farther in the unregulated state, by means of the gas pedal 103, than in the regulated state, by means of the control motor 126.

To mechanically limit the regulated operating state of the apparatus to a predetermined engine output range, the rotation of the third rotary element 119 into one or the other direction of rotation may be limited by end stops, attached to the vehicle, for the third rotary element. In the exemplary embodiment shown, the regulated state, with variation in the direction of an output increase (arrow L), is limited by an end stop 135, against which a spring 136 acting upon the third rotary element 119 in the direction of the arrow L' comes to rest whenever the end of the intended output increase range is reached in the rotation of the first rotary element 109, to prevent further rotation of the first rotary element 109 in the direction of an output increase. The spring 136 shortens the idle travel between the stop 122 and the pawl 123 at the onset of regulation in the direction of an output reduction, to provide fast reaction at the onset of regulation, for instance in the event of drive slip.

In the case of influence in the direction of an output increase, once the third rotary element 119 has come to rest with its stop 121 on the pawl 123 of the first rotary element 109, all three rotary elements 108, 109, 119 remain in contact with their respective stops facing one another (stop 114 in contact with stop 115, and stop 121 in contact with stop 123) and are rotated in common by the control motor 126, as a result of which the throttle valve 107 is either adjusted via the cable pull 105 in the direction of an engine output increase as compared with the uninfluenced position predetermined by the gas pedal, or is adjusted by the control motor 126 by a rotational angle determined by the regulating device triggering the control motor 126. The operative connection between the drive wheel 126 and the third rotary element 119 is then interrupted by the pivoting of the rocker 131 back into its position of repose by the force of the spring 134, and the first rotary element 109 and the third rotary element 113 are pulled back, by the restoring spring 118 and the cable pull 105, into the position corresponding to the gas pedal position.

In the case of influence in the direction of an output reduction, once the third rotary element 119 has come to rest with its stop 122 on the pawl 123 of the first rotary element 109, the first rotary element 109 is rotated out of its contact with the second rotary element 108, counter to the action of the spring 116. As a result, the two stops 114 and 115 are separated from one another, the tension of the spring 116 is increased, and the throttle valve 107 is adjusted, via the cable 105 and the restoring spring 118, in the direction of an engine output reduction, compared with the uninfluenced position predetermined by the gas pedal position with the rotary elements 108 and 109 in contact with one another, until such time as the control motor 126 is switched off. Then the operative connection between the drive wheel 124 and the third rotary element 119 is interrupted by the pivoting of the rocker arm 131 back into its position of repose, and the first rotary element 109, with the gas pedal position remaining unchanged, is rotated by the spring 116 back into contact with the second rotary element 108, and thus the throttle valve 107 is rotated back into its uninfluenced position that it had occupied before the regulation process.

Since the operative connection of the control motor 126 with the third rotary element 119 is maintained only as long as the drive moment of the control motor 126 keeps the rocker arm 131 rotated in one direction or the other counter to the force of either the spring 133 or the spring 134, the control motor 126 is not rotated along with the other elements during unregulated operation of the apparatus.

Instead of the slip coupling effecting the coupled motion of the rocker arm 131, some other mechanism may be used to shift the drive wheels 124 and 125 out of the position of repose into the working position. For example, the rocker arm 131 could be pivoted back and forth between the position of repose and the working position with the aid of electromagnets, which engage parts of the rocker extending out of the gear 127.

In another exemplary embodiment of the apparatus of the invention, not shown, no mechanical limitation of the regulated operating state is provided; the toothed segment of the third rotary element of the exemplary embodiment of FIGS. 3 and 4 is therefore secured directly to the first rotary element, and the third rotary element is omitted. This exemplary embodiment is otherwise identical to the embodiment of FIGS. 3 and 4.

In the exemplary embodiments shown here, the various directions indicated for the adjustment of the control device for increasing or decreasing the output of the engine are purely exemplary.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. An apparatus for varying the position of a fuel control device (7, 107) that controls the output of an internal combustion engine which comprises an operating element (3, 103) which manually operates a transmission device (6, 106), in which a control motor (21, 126) can be operatively connected via a gear assembly (22, 127) with a first rotary element (9, 109) connected to the fuel control device (7, 107), said first rotary element is rotatably supported relative to a coaxial second rotary element (8, 108) operatively connected to the operating element (3, 103), wherein said two rotary elements (9, 8 or 109, 108) are prestressed by a spring (16, 116), forcing arms thereon to contact one another at stops (14, 15, 114, 115) disposed facing one another, said assembly gear (22, 127) has at least one drive wheel (20, 124, 125) operatively connected to the control motor (21, 126), which drive wheel can be shifted from a position of repose, in which an operative connection with the first rotary element (9, 109) is interrupted, into a working position, in which the operative connection with the first rotary element (9, 109) is established.

2. An apparatus as defined by claim 1, in which each direction of rotation of the first rotary element (109), the gear assembly (127) has a separate drive wheel (124, 125) shiftable out of a position of repose into a working position.

3. An apparatus as defined by claim 1, in which said drive wheel (20, 124, 125) is shiftable out of a position of repose into a working position by startup of the control motor (21, 126).

4. An apparatus as defined by claim 2, in which said drive wheel (20, 124, 125) is shiftable out of a position of repose into a working position by startup of the control motor (21, 126).

5. An apparatus as defined by claim 1, in which said drive wheel (20, 124, 125) is supported on a rocker arm (26, 131) that is rotatable about a pivot shaft of a pinion (24, 129) which drives the drive wheel (20, 124, 125).

6. An apparatus as defined by claim 2, in which said drive wheel (20, 124, 125) is supported on a rocker arm (26, 131) that is rotatable about a pivot shaft of a pinion (24, 129) which drives the drive wheel (20, 124, 125).

7. An apparatus as defined by claim 3, in which said drive wheel (20, 124, 125) is supported on a rocker arm (26, 131) that is rotatable about a pivot shaft of a pinion (24, 129) which drives the drive wheel (20, 124, 125).

8. An apparatus as defined by claim 4, in which said drive wheel (20, 124, 125) is supported on a rocker arm (26, 131) that is rotatable about a pivot shaft of a pinion (24, 129) which drives the drive wheel (20, 124, 125).

9. An apparatus as defined by claim 5, in which said drive wheels (124, 125) are supported on a rocker arm (131) and mesh with the same pinion (129).

10. An apparatus as defined by claim 6, in which said drive wheels (124, 125) are supported on a rocker arm (131) and mesh with the same pinion (129).

11. An apparatus as defined by claim 7, in which said drive wheels (124, 125) are supported on a rocker arm (131) and mesh with the same pinion (129).

12. An apparatus as defined by claim 8, in which said drive wheels (124, 125) are supported on a rocker arm (131) and mesh with the same pinion (129).

13. An apparatus as defined by claim 4, in which said rocker arm (26) is prestressed by means of a spring (28) into a position of repose, in which the operative connection of the applicable drive wheel (20) with the first rotary element (9) is interrupted.

14. An apparatus as defined by claim 9, in which said rocker arm (26) is prestressed by means of a spring (28) into a position of repose, in which the operative connection of the applicable drive wheel (20) with the first rotary element (9) is interrupted.

15. An apparatus as defined by claim 5, in which said rocker arm (131) is prestressed by two contrarily acting springs (133, 134) into a position of repose, in which position the operative connection of the applicable drive wheel (124, 125) with the first rotary element (109) is interrupted.

16. An apparatus as defined by claim 9, in which said rocker arm (131) is prestressed by two contrarily acting springs (133, 134) into a position of repose, in which position the operative connection of the applicable drive wheel (124, 125) with the first rotary element (109) is interrupted.

17. An apparatus as defined by claim 4, in which said rocker arm (26, 131) is operatively connected via a slip coupling with a pinion (24, 129) driving the drive wheel (20, 124, 125).

18. An apparatus as defined by claim 5, in which said rocker arm (26, 131) is operatively connected via a slip coupling with a pinion (24, 129) driving the drive wheel (20, 124, 125).

19. An apparatus as defined by claim 9, in which said rocker arm (26, 131) is operatively connected via a slip coupling with a pinion (24, 129) driving the drive wheel (20, 124, 125).

20. An apparatus as defined by claim 13, in which said rocker arm (26, 131) is operatively connected via a slip coupling with a pinion (24, 129) driving the drive wheel (20, 124, 125).

21. An apparatus as defined by claim 15, in which said rocker arm (26, 131) is operatively connected via a slip coupling with a pinion (24, 129) driving the drive wheel (20, 124, 125).

22. An apparatus as defined by claim 2, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

23. An apparatus as defined by claim 3, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

24. An apparatus as defined by claim 4, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

25. An apparatus as defined by claim 5, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

26. An apparatus as defined by claim 9, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

27. An apparatus as defined by claim 13, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

28. An apparatus as defined by claim 15, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

29. An apparatus as defined by claim 17, which includes a third rotary element (119) that is operatively connected with the drive wheel (124, 125) by a shifting thereof and is coaxially rotatable with the first rotary element (109) in which said third rotary element (119) can be brought into engagement with a pawl (123) disposed on the first rotary element (109).

* * * * *